United States Patent [19]

Miller

[11] Patent Number: 5,174,903
[45] Date of Patent: Dec. 29, 1992

[54] PROCESS FOR REMOVING PROTEINACEOUS MATERIALS, FATS AND OILS FROM FOOD PROCESSING WASTEWATER AND RECOVERING SAME

[76] Inventor: Jack C. Miller, 1937 Bramblewood Trail, Pfafftown, N.C. 27040

[21] Appl. No.: 629,134

[22] Filed: Dec. 18, 1990

Related U.S. Application Data

[63] Continuation-in-part of Ser. No. 564,424, Aug. 7, 1990, abandoned.

[51] Int. Cl.$^5$ ................................................ C02F 1/56
[52] U.S. Cl. .................................... 210/725; 210/728; 210/730
[58] Field of Search ............... 210/725, 727, 728, 730, 210/731

[56] References Cited

U.S. PATENT DOCUMENTS

| | | | |
|---|---|---|---|
| 2,200,784 | 5/1940 | Wallace | 210/730 |
| 2,471,474 | 5/1949 | Alba et al. | 210/730 |
| 2,993,006 | 7/1961 | Allen et al. | 210/730 |
| 3,627,680 | 12/1971 | Desbos | 210/730 |
| 3,763,139 | 10/1973 | Falkehag | 210/730 |
| 3,850,799 | 11/1974 | Ludwig | 210/47 |
| 4,061,568 | 12/1977 | Hall | 210/44 |
| 4,363,733 | 12/1982 | Meiller et al. | 210/730 |
| 4,565,635 | 1/1986 | Le Du et al. | 210/730 |
| 4,933,087 | 6/1990 | Markham, Jr. et al. | 210/730 |

OTHER PUBLICATIONS

Ultrafiltration Treatment of Poultry Processing Wastewater and Recovery of a Nutritional By-Product, J. Shih and M. Kozink, pp. 247-252, Poultry Science, vol. 59, Feb. 1980.
Industrial Wastes: Recovery of Proteins from Packinghouse Waste by Super-Chlorination, H. Halvorson, et al., pp. 489-501, Recovery of Proteins by Super Chlorination, vol. 3, No. 3.

*Primary Examiner*—Thomas Wyse
*Attorney, Agent, or Firm*—Bell, Seltzer, Park & Gibson

[57] ABSTRACT

A process for removing proteinaceous materials, fats and oils from food processing wastewater using a coagulant such as lignin or a halogen ion containing compound together with a flocculant such as a natural polymer such as a polysaccharide or synthetic polymer is described. The combination of lignin or halogen and polymer is effective for coagulating and flocculating proteinaceous materials, fats and oils in food processing wastewater at low pH.

17 Claims, No Drawings

PROCESS FOR REMOVING PROTEINACEOUS MATERIALS, FATS AND OILS FROM FOOD PROCESSING WASTEWATER AND RECOVERING SAME

CROSS-REFERENCE TO RELATED APPLICATIONS

This application is a continuation-in-part of U.S. patent application Ser. No. 07/564,424 filed Aug. 7, 1990, abandoned.

BACKGROUND OF THE INVENTION (1) Field of the Invention

This invention relates to a process for the purification of food processing wastewater and the recovery of proteinaceous materials, fats and oils therefrom. More particularly, this invention relates to the use of a combination of a soluble lignin or a halogen and natural or synthetic polymers to coagulate and flocculate proteinaceous materials, fats and oils from the wastewaters of food processing plants.

(2) Description of the Prior Art

Processing water from poultry plants, cattle slaughter houses, rendering plants, seafood processing plants, other food processing plants, such as margarine and soya bean processing plants, and the like all discharge wastewater which pollutes the waterways without proper treatment but the effluent contains proteinaceous materials, fats and oils which, if recovered, can be used in economically valuable animal feed. For example, the material recovered from poultry wastewater may contain from 30 to 35% true proteins and from 24 to 45% fat. The amino acid composition of the poultry wastewater by-product is similar to soybean meal. "Ultrafiltration Treatment of Poultry Processing Wastewater and Recovery of a Nutritional By-Product," J. C. Shih et al. *Poultry Science*, Volume 59, pages 247–252 (1980).

Efforts to reduce the environmental problems associated with food processing wastewater by removing proteinaceous materials, fats and oil has been ongoing for many years. For example, such efforts are reported by Messrs. H. O. Halvorson, A. R. Cade, and W. J. Fullen, "Recovery of Proteins From Packinghouse Waste by Super-Chlorination", *Sewage Works Journal*, Vol. 3, pages 488–501 (1931), in which coagulation of proteins using chlorine and other halogens is described.

Various forms of lignin have also been used as coagulating and flocculating agents to treat wastewater. For example, U.S. Pat. No. 2,200,784 teaches flocculation of aqueous liquids carrying colloidal material, such as sewage, with solubilized alkaline lignin and adjusting the mixture pH to 6.5 or less. In U.S. Pat. No. 2,471,474 water-soluble alkali lignin is combined with proteins to form a precipitate and used to purify and clarify beverages. U.S. Pat. No. 3,850,799 teaches the use of lignins cross-linked with polyoxyalkylene linkages as flocculating agents in wastewater treatment.

Other types of compounds have also been used in the recovery of proteinaceous materials, fats and oils from wastewater. For example, U.S. Pat. No. 4,061,568 teaches the use of acid hydrolyzing metal salts, such as iron ($Fe^{+3}$) and aluminum ($Al^{+3}$) salts as flocculating agents for recovery proteins from fat refining plants, margarine and other food processing plants. The metal salt forms a complex with the proteins and fats in wastewater which has been acidified; the complex is precipitated with calcium hydroxide; and the complex is separated as a sludge by sedimentation, centrifugation or flotation.

U.S. Pat. No. 4,933,087 describes a process for coagulating and flocculating proteins and fats in food processing wastewater by acidifying the wastewater, adding an alginate, allowing the wastewater to react, adding activated biological sludge to improve the coagulating properties of the floc, e.g. floc size. Additional materials including hydrated lime, finely-milled peat, acidified peat or activated carbon may also be used in the process.

It is the general object of this invention to provide a process for removing proteinaceous materials, fats and oils from food processing wastewater by admixing acidified wastewater with a coagulating compound and a natural or synthetic polymer.

Another object of this invention is to provide a process for producing a material suitable for use in animal feed.

A further object of this invention is to provide a process of treating a wastewater stream from a food processing plant whereby the BOD, ammonia, oil and grease content, and suspended solids (in the effluent water) are substantially reduced.

Other objects, features and advantages of the invention will be apparent from the following details of the invention as more fully described.

SUMMARY OF THE INVENTION

In accordance with these objects and the principles of this invention, it has been found that proteinaceous materials, fats and oils may be effectively removed from food processing wastewater and recovered by treating a wastewater with either a soluble lignin or a halogen to coagulate or complex the proteinaceous materials, fats and oils and to flocculate the coagulated material with a natural or synthetic polymer or mixture of polymers. The treated proteinaceous materials, fats and oils may be separated from the wastewater and recovered using conventional means. In most food processing wastewater it is necessary to acidify the wastewater, preferably before adding the coagulating and flocculating compounds.

DETAILED DESCRIPTION OF THE INVENTION

The process of this invention provides that proteinaceous materials, fats and oils may be removed from food processing wastewater, such as meat and poultry slaughter and processing plants, and other food processing plants that have wastewater streams containing proteinaceous materials, fats and oils. Other food processing plants include for example, fat refining plants in the margarine industry or soya bean processing plants.

Raw wastewater from a food processing plant, such as a poultry processing plant, contains proteinaceous materials, fats and oils in varying amounts. The amount of proteinaceous materials, fats and oils in the wastewater varies greatly from less than 1% to over 50% of the total amount of solids. If the amount of proteinaceous materials in the wastewater is more than about 10% of the total amount of solids, as is usually the case, the pH of the wastewater is reduced to a pH below the isoelectric point of the proteinaceous materials. A mineral acid such as sulfuric acid or hydrochloric acid may be used. Other acids, such as polycarboxylic acid, polysulfonic acid and polyacrylic are also suitable. The isoelectric point of the proteinaceous material is normally below a pH of about 4.5, and the wastewater is acidified to preferably between a pH of about 3.0 to about 4.5. When the wastewater is acidified below a pH of 3.0 the flocculant does not work as well as at the higher pHs.

To the acidified wastewater, a coagulant is added. The preferred coagulant is a soluble lignin but halogens, such as chlorine have also been found to be effective.

Lignin is a polymeric substance composed of substituted aromatics primarily obtained as a by-product of the pulp and paper industry, where lignin-containing materials such as wood, straw, bagasse, and the like are processed to recover cellulose or pulp. The residual pulping liquors contain the lignin. Lignins obtained by any method or from any source may be used in the process of this invention as long as the lignin is in a form soluble in the wastewater stream.

In residual pulping liquors obtained in the sulfate and other alkaline pulping processes, the lignins are present as alkaline metal salts dissolved in the alkaline aqueous liquor and are not sulfonated. In the sulfite pulping process, the lignocellulosic material is digested with a bisulfite or sulfite resulting in the sulfonation of the lignins. These lignins and sulfonated alkali lignins are referred to as lignosulfonates. "Hydrolysis lignin" obtained from the hydrolysis of lignocellulosic materials in manufacture of sugar is likewise altered somewhat from that found in the plant but is water-insoluble and has to be further modified before it can be used.

The lignins which may be used in the process of this invention may be subjected to various treatments such as, acid, alkaline or heat treatments or reacted with the other chemicals such as sulfonation which may further alter somewhat the lignin constituents. The lignins remain operative as long as the treatment is not so severe as to destroy the basic polymeric structure or substantially decrease the phenolic hydroxyl content of the lignin.

The lignin-containing product obtained in the separation or recovery of lignins generally contain lignins of various molecular weights varying from less than 1,000 to over 100,000. These products also may contain other constituents besides the lignins. For example, in the sulfite pulping process, the spent sulfite liquor contains lignosulfonates which may be present as salts of cations, such as magnesium, calcium, ammonium, sodium and other cations which may have been present during the sulfonation of the lignin. The spent sulfite liquor generally contains only about 40 to 60 weight percent on an oven-dried basis of lignosulfonates with the remainder being carbohydrates and other organic and inorganic constituents dissolved in the liquor. It is not necessary to separate the lignin-containing constituents from the other constituents.

Among the lignins which may be used in the process of this invention are the sodium salt of alkali lignin, such as Indulin C, and amine alkali lignins, such as Indulin W-1. Also, sulfonated lignins, such as sodium sulfonated lignin, Polyfon F; sulfonated alkali lignin, REAX 80C, and the sulfonic acid, ethoxylated sodium salt of alkali lignin, PC 825 may be used. These lignins are available from Westvaco Corporation, North Charleston, S.C.

The amount of soluble lignin or halogen-containing compound which is added to the food processing wastewater will vary depending upon the character of the wastewater, i.e., the amount of BOD, proteinaceous materials, fats, oils and suspended matter present. Generally, the amount of soluble lignin or halogen compound added is that amount which is effective to obtain charge neutralization (coagulation) of the proteinaceous material. The amount of soluble lignin added is typically from about 5 to about 100 parts per million of wastewater, preferably about 20 to about 30 parts per million of wastewater. Increasing the amount of lignin will increase effluent clarity and floc size.

The halogens which may be used in the process of this invention include chlorine, fluorine, bromine and iodine, with chlorine being preferred. The halogen is supplied to the wastewater as a halogen-containing compound in which the halogen is released in an ionic form. When chlorine is the halogen used any chemical source providing the chloride or hypochlorite ion is suitable such as sodium hypochlorite or hydrochlorous acid. The amount of halogen ion in the halogen-containing compound added is generally about 5 to about 100 parts per million of wastewater.

Among the natural polymers which may be used are polysaccharides derived from seaweed, such as alginates, agar, furcellaran and carrageenan (Gelcarin PS 402 from Marine Colloids) and their derivatives, such as sodium alginate (Kelgin from Kelco). Various microbial derived polysaccharides including xanthum gum (Kelzan from Kelco, division of Merck), dextran gum, gellan gum, rhamsan gum and welan gum also may be used. Further, polysaccharides derived from starches, such as potato, corn, tapioca, wheat and arrow root, their chemically modified derivatives and cellulose derivatives may be used. Also plant-derived polysaccharides are contemplated for use in this invention. Among the plant-derived polysaccharides are guar gums, such as cationic substituted, carboxymethyl substituted guar gums and carboxymethyl-hydroxypropyl substituted guar gums. These guar gums are available under the Jaguar brand from Hi-Tek Polymer. Other plant-derived polysaccharides include arabic gum, tragacanth gum, karaya gum, locust bean gum, pectin and their derivatives.

The higher molecular weight natural polymers, such as xanthum gum, produce larger floc at lower dosages than the lower molecular weight polymers, such as sodium alginate. The amount of polymer added will also vary depending on the amount of coagulated and suspended solids present or floc size desired. The amount of natural polymer added is typically from about 1 to about 50 parts per million and preferably 20 to 35 parts per million.

In addition, cationic, anionic, or nonionic synthetic polymers may be used as the polymer. A preferred synthetic polymer would be an anionic polymer of the polyacrylamide family, especially a high molecular weight polymer. In addition to polyacrylamides other cationic polyelectrolyte polymers include polyamines, for example, poly(2, hydroxy propyl-N, N-demethyl ammonium chloride) and polydadmacs. Polydadmac, e.g., poly(dimethyl diallyl ammonium chloride) polymers which may be used is Agefloc WT-40 available from CPS Chemical Co. Anionic polyelectrolytes include carboxyl-type based on acrylamide, polyacrylic acid, polycarboxylic acid and polymethacrylic acid. The higher molecular weight polymers can be used as the flocculant, and in some instances as both the coagulant and flocculant. The lower molecular weight synthetic polymers could be used as the coagulant. The amount of synthetic polymer added to the wastewater is an effective amount to flocculate the proteinaceous material to the desired size. Generally, the amount of synthetic polymer added to the wastewater is from 1 to about 50 parts per million of wastewater.

In certain food processing wastewaters containing negatively charged particles, a cationic polyacrylamide of high molecular weight may be preferred over the anionic or nonionic polymers. Generally, as the molecular weight of the polymer increases, the amount of polymer needed to obtain the same size floc is less. The combination of lignin and synthetic polymer was more cost effective than synthetic polymer or natural polymer alone.

The acid and coagulant may be added simultaneously but most wastewaters form a better floc if acidification is done first and then followed by coagulant. The polymer (natural or synthetic) is then added for flocculation. The coagulation and flocculation of the proteinaceous materials may be carried out in a holding tank but because the flocculation occurs rather quickly, the process may be continuously carried out in say, for example, a pipeline leaving the food processing plant or in a pipeline leaving the holding tank, prior to the treatment system.

The coagulated and flocculated proteinaceous materials, fats and oils may be separated from the wastewater and further dewatered using well-known recovery methods, such as centrifugating, dissolved air flotation, settling or pressing. Thus recovered material may be further processed into useful products such as animal feeds.

Reductions in BOD, ammonia, and total suspended solids of 85%, 67%, and 90%, respectively, using the process of this invention are unexpected better than what is typically achieved using metal ($Al^{+3}$, and $Fe^{+3}$) salts, or an anionic polyelectrolyte.

The following examples are provided to further illustrate the present invention and are not to be construed as limiting the invention in any manner. All parts are parts by weight unless otherwise stated. The following testing methods from Standard Methods for Examination of Water and Wastewater were used to determine the values obtained in the test results.

| Test No. | For |
| --- | --- |
| 503A | Oil and Grease |
| 417D | Ammonia ($NH_3$) |
| 507 | Biochemical Oxygen Demand (BOD) |
| 209D | Suspended Solids (SS) |

EXAMPLE 1

The process of this invention was carried out by varying the amounts of lignin and xanthum gum in test runs. Wastewater from a poultry slaughter house was acidified with 50% sulfuric acid to a pH about 3.4. Alkali lignin, Indulin C from Westvaco Corporation was added to the wastewater as a coagulant in varying amounts ranging from 0 to 40 ppm. Xanthum gum, Kelzan from Kelco, a division of Merck, was added to the wastewater as a flocculant in amounts varying from 0 to 32 ppm. The results are shown in Table 1.

TABLE 1

| Test No. | Lignin, ppm | Xanthum Gum, ppm | Results |
| --- | --- | --- | --- |
| 1 | 20 | 8 | Somewhat cloudy effluent |
| 2 | 20 | 16 | Somewhat cloudy effluent |
| 3 | 30 | 8 | Clearer effluent, medium size floc |
| 4 | 30 | 16 | Clearer effluent, medium size floc |
| 5 | 40 | 8 | Clear effluent, medium size floc |
| 6 | 40 | 16 | Clear effluent, large size floc |
| 7 | 0 | 32 | Cloudy effluent, stringy floc |
| 8 | 40 | 0 | Small pin floc, clear effluent |

As the amount of lignin was increased from 20 to 40 ppm the amount of floc and size of the floc increased, as did clarity, indicating better removal of BOD and suspended matter. However, the floc was still very small. The addition of xanthum gum in the amount of 8 to 16 ppm increased the size of the floc particles to where they were more suitable for air flotation or settling. The sample from Test 5 was tested for BOD, ammonia removal and suspended solids.

TABLE 1A

|  | BOD, ppm | $NH_3$, ppm | SS, ppm |
| --- | --- | --- | --- |
| Raw waste | 3,400 | 30 | 1,246 |
| Treated Water, Test 5 | 550 | 10 | 112 |
| % Removal | 85% | 67% | 91% |

Increasing the lignosulfonate from 20 to 40 ppm gave a clearer effluent. The addition of xanthum gum at higher levels, i.e., 8 to 16 ppm, and higher lignosulfonate produced an increasing larger floc size. Xanthum gum without lignin present, produced a poor effluent and a stringy floc. The BOD, ammonia and suspended solids content removal were all successful, removing 85%, 67% and 91%, respectively.

EXAMPLE 2

The same procedure as used in Example 1 was followed, but the alkali lignin addition remained constant and carrageenan was used as the natural polymer. The amount of carrageenan was varied from 8 to 32 parts per million. In this example, approximately 16 ppm of carrageenan was equivalent to 8 ppm of xanthum gum for equivalent floc size. The higher dosage was probably due to the lower molecular weight of carrageenan when compared to that of xanthum gum. The results are shown in Table 2.

TABLE 2

| Test No. | Lignin, ppm | Carrageenan, ppm | Results |
| --- | --- | --- | --- |
| 1 | 40 | 8 | Small floc, clear effluent |
| 2 | 40 | 16 | Medium floc, clear effluent |
| 3 | 40 | 24 | Large floc, clear effluent |
| 4 | 40 | 32 | Very large floc, clear effluent |

The sample from test No. 2 was tested for BOD removal and 90% BOD was removed.

EXAMPLE 3

The experiment of Example 1 was repeated with various dosages of carrageenan alone being used to provide a comparison with the combination of lignin and natural polymer.

TABLE 3

| Test No. | Lignin, ppm | Carrageenan, ppm | Results |
|---|---|---|---|
| 1 | 0 | 8 | Small floc, cloudy effluent |
| 2 | 0 | 16 | Small floc, cloudy effluent |
| 3 | 0 | 24 | Medium floc, clearer effluent |
| 4 | 0 | 32 | Large floc, clearer effluent |

A higher dosage of carrageenan was required when used alone to obtain equivalent floc size, than when carrageenan is used in conjunction with lignin. This is probably due to carrageenan acting both as a coagulant (charge neutralization), and flocculant.

EXAMPLE 4

The wastewater was again acidified, and alkali lignin in amounts of from 0 to 30 ppm was added, along with 2 to 4 ppm of synthetic polymer, an anionic polyacrylamide, POLY NC-350 from Polymer Systems, Inc. of Winston-Salem, N.C. The addition of lignin greatly reduced the amount of organic polymer required, from the 20 to 30 ppm range without lignin to 2 to 4 ppm. The results are shown in Table 4.

TABLE 4

| Test No. | Lignin, ppm | Polyacrylamide, ppm | Results |
|---|---|---|---|
| 1 | 0 | 10 | Light fluffy floc; turbid effluent |
| 2 | 0 | 20 | Slightly better floc |
| 3 | 0 | 30 | Good floc formation; clear effluent |
| 4 | 10 | 2 | Small floc; clear effluent |
| 5 | 20 | 2 | Medium floc; clear effluent |
| 6 | 30 | 2 | Large floc; clear effluent |
| 7 | 10 | 4 | Medium floc; clear effluent |
| 8 | 20 | 4 | Large floc; clear effluent |
| 9 | 30 | 4 | Large floc; clear effluent |

The results show the effectiveness of producing large floc and clear effluent when lignin and polyacrylamide are used together. Thus, 20 to 30 ppm of lignin and 2 to 4 parts of polyacrylamide was equivalent to 30 ppm of synthetic polymer alone.

EXAMPLE 5

Wastewater from a turkey plant was treated with aluminum, and iron salts and the BOD reduction was compared to acidified wastewater treated with lignin at 30 ppm and carrageenan at 16 ppm. The results are shown in Table 5.

TABLE 5

| | BOD, ppm | % Removal |
|---|---|---|
| Raw Waste Water - Turkey Plant | 1,425 | |
| Lignin/Carrageenan Treatment | 153 | 89 |
| Chemical Treatment - $Al^{+3}$ Salt | 321 | 77 |
| Chemical Treatment - $Fe^{+3}$ Salt | 608 | 58 |

Treatment of wastewater using the process of this invention (lignin/carrageenan) reduced BOD by 89%; compared to only 77% when $Al^{+3}$ was used and 58% when $Fe^{+3}$ was used. This sample shows better BOD removal using the process of this invention than using metallic salts.

EXAMPLE 6

Wastewater from another turkey processing plant was acidified to a pH of 3.0, and lignin in amounts ranging from 0 to 100 ppm. Sodium alginate in the amounts from 10 to 30 ppm was added, as the flocculent. The results are shown in Table 6.

TABLE 6

| Test No. | Lignin, ppm | Sodium Alginate, ppm | Results |
|---|---|---|---|
| 1 | 0 | 16 | Poor floc, turbid effluent |
| 2 | 25 | 32 | Small floc, slightly turbid |
| 3 | 50 | 10 | Small floc, clear effluent |
| 4 | 50 | 20 | Medium floc, clear effluent |
| 5 | 50 | 30 | Large floc, clear effluent |
| 6 | 100 | 10 | Small floc, clear effluent |
| 7 | 100 | 20 | Large floc, clear effluent |

As the lignin was increased, floc size increased, and the effluent clarity improved. Likewise increasing the alginate, increased the size of the floc.

The sample from test no. 4 was tested for BOD and O&G removal. There was 825 ppm BOD and 262 ppm O&G in the untreated wastewater. After treatment with 50 ppm lignin and 30 ppm sodium alginate, the BOD was reduced to 189 ppm and the O&G reduced to 27 ppm. This was a reduction of 77% in BOD and 90% in O&G.

EXAMPLE 7

After acidification to a pH of 3.6, poultry wastewater was chlorinated according to the method described by Messrs. H. O. Halvorson et al., noted above. The acidified wastewater was then flocculated with carrageenan, sodium alginate, xanthum gum, and two synthetic polyacrylamides, anionic polymer POLY NC-350 and nonionic polymer POLY NC-500 both from Polymer Systems, Inc. The results are shown in Table 7.

TABLE 7

| Test No. | Flocculant | ppm | Comments* |
|---|---|---|---|
| 1 | Carrageenan | 25 | Medium floc |
| 2 | Sodium alginate | 25 | Small floc |
| 3 | Xanthum gum | 25 | Large floc |
| 4 | Polyacrylamide, anionic | 25 | Large floc |
| 5 | Polyacrylamide, | 25 | Large floc |

TABLE 7-continued

| Test No. | Flocculant | ppm | Comments* |
|---|---|---|---|
| | non-anionic | | |

*All of the effluents were clear.

The resulting effluent was clear, indicating good BOD, O&G removals.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for removing proteinaceous materials, fats and oils from wastewater which comprises:
   (a) acidifying said wastewater;
   (b) admixing said wastewater with an amount of a water soluble lignin effective to coagulate said proteinaceous materials, fats and oils in said wastewater, and admixing said wastewater with an amount of a natural polymer effective to flocculate said proteinaceous materials, fats and oils in said wastewater,
   (c) reacting said admixture for a time sufficient to coagulate and flocculate said proteinaceous materials, fats and oils; and
   (d) separating the reacted admixture from said wastewater.

2. The process according to claim 1 wherein said wastewater is acidified below the isoelectric point of the proteinaceous materials.

3. The process according to claim 2 wherein said wastewater is acidified to a pH below 4.5.

4. The process according to claim 3 wherein said wastewater is acidified to a pH between 4.5 and 3.0.

5. The process according to claim 1 wherein said acidifying is carried out by addition of a mineral acid.

6. The process according to claim 1 wherein the wastewater is acidified prior to admixing the coagulating compound and the polymer compound.

7. The process according to claim 1 wherein said coagulating compound is a soluble lignin selected from the group consisting of alkali lignin and lignosulfonate.

8. The process according to claim 7 wherein said lignin is added in an amount from about 5 to about 100 parts per million of wastewater.

9. The process according to claim 8 wherein said lignin is added in an amount from about 20 to about 30 parts per million of wastewater.

10. The process according to claim 1 wherein said natural polymer is a polysaccharide.

11. The process according to claim 10 wherein said polysaccharide is selected from the group consisting of microbial-derived polysaccharides, plant-derived polysaccharides and seaweed-derived polysaccharides.

12. The process according to claim 1 wherein said polymer compound is a natural polymer selected from the group consisting of an alginate, xanthum gum, carrageenan, agar and dextran gum.

13. The process according to claim 1 wherein said polymer compound is added in an amount from about 1 to about 50 parts per million of wastewater.

14. The process according to claim 13 wherein said polymer compound is added in an about from about 20 to about 35 parts per million of wastewater.

15. The process according to claim 1 wherein said reacted admixture is separated by dissolved air flotation, settling, centrifuging or pressing.

16. A process for removing proteinaceous materials, fats and oils from wastewater comprising:
   (a) acidify the wastewater to a pH below the isoelectric electric point of the proteinaceous materials;
   (b) admixing with the wastewater a water soluble lignin selected from the group consisting of alkali lignin and lignosulfonates in an amount from about 5 to about 100 parts of lignin per million parts of wastewater and a natural polymer selected from the group consisting of microbial-derived polysaccharides, plant-derived polysaccharides and seaweed-derived polysaccharides in an amount from about 1 to about 50 parts of polymer per million parts of wastewater;
   (c) reacting the admixture for a time sufficient to coagulate and flocculate the proteinaceous materials, fats and oils; and
   (d) separating the reacted mixture from the wastewater.

17. A process for removing proteinaceous materials, fats and oil from food processing wastewater comprising:
   (a) acidify the wastewater to a pH between 3.0 and 4.5 with a mineral acid;
   (b) admixing with the wastewater from about 20 to about 30 parts per million of wastewater of a water soluble lignin and from about 20 to about 35 parts per million of a compound selected from the group consisting of sodium alginate, xanthum gum, and carrageenan to form a mixture with the proteinaceous material;
   (c) reacting the admixture for a time sufficient to flocculate and coagulate the proteinaceous materials, fats and oils; and
   (d) separating the reacted admixture from the wastewater.

* * * * *